United States Patent
Suh et al.

[11] Patent Number: 5,889,069
[45] Date of Patent: Mar. 30, 1999

[54] HIGH TEMPERATURE SYNDIOTACTIC STYRENE POLYMER FOAM

[75] Inventors: Kyung W. Suh; Creston D. Shmidt; Daniel D. Imeokparia; Alan E. Platt; Thomas E. Wessel, all of Midland, Mich.

[73] Assignee: The Dow Chemical Company, Midland, Mich.

[21] Appl. No.: 893,149

[22] Filed: Jul. 15, 1997

[51] Int. Cl.$^6$ .................................. C08J 9/00; C08J 9/14
[52] U.S. Cl. ............................. 521/138; 521/59; 521/79; 521/81
[58] Field of Search ...................... 521/139, 138, 521/59, 79, 81

[56] References Cited

U.S. PATENT DOCUMENTS

| | | |
|---|---|---|
| 3,449,268 | 6/1969 | Scheffler . |
| 3,449,270 | 6/1969 | Saunders et al. . |
| 3,830,001 | 8/1974 | Winstead . |
| 4,185,352 | 1/1980 | Smith . |
| 4,420,291 | 12/1983 | Winstead . |
| 4,436,679 | 3/1984 | Winstead . |
| 4,454,087 | 6/1984 | Hayashi et al. . |
| 4,472,556 | 9/1984 | Lipowitz et al. . |
| 4,491,553 | 1/1985 | Yamada et al. . |
| 4,824,629 | 4/1989 | Seitz et al. . |
| 4,857,390 | 8/1989 | Allen et al. . |
| 4,859,339 | 8/1989 | Wessling et al. . |
| 4,937,272 | 6/1990 | Sumitomo ................. 521/59 |
| 4,946,897 | 8/1990 | Albizzati et al. . |
| 4,958,933 | 9/1990 | Zakich . |
| 4,980,101 | 12/1990 | Beck et al. . |
| 4,985,505 | 1/1991 | Gunesin et al. . |
| 5,034,171 | 7/1991 | Kiczek et al. . |
| 5,066,741 | 11/1991 | Campbell, Jr. . |
| 5,120,481 | 6/1992 | Brackman et al. . |
| 5,164,479 | 11/1992 | Funaki et al. . |
| 5,171,834 | 12/1992 | Funaki . |
| 5,250,576 | 10/1993 | Desmarais et al. . |
| 5,269,987 | 12/1993 | Reedy et al. . |
| 5,357,014 | 10/1994 | Uchida et al. . |
| 5,411,687 | 5/1995 | Ieokparia et al. . |
| 5,460,818 | 10/1995 | Park et al. ................. 521/59 |
| 5,464,878 | 11/1995 | Nemphos et al. ........... 521/50 |
| 5,525,667 | 6/1996 | Forbes et al. ............. 521/146 |

FOREIGN PATENT DOCUMENTS

| | | |
|---|---|---|
| 2029164 | 6/1991 | Canada . |
| 064343 | 10/1982 | European Pat. Off. . |
| 463759A | 2/1992 | European Pat. Off. . |
| 3316838A | 5/1983 | Germany . |
| 4325879A1 | 8/1993 | Germany . |
| 369037A | 12/1994 | Germany . |
| 7300544R | 10/1970 | Japan . |
| 05200835A | 1/1992 | Japan . |
| 2248438A | 3/1989 | Jordan . |
| 4027519A | 5/1990 | Jordan . |
| 667436 | 1/1965 | Saudi Arabia . |
| 225502A | 6/1993 | Taiwan . |
| 1781067A1 | 12/1990 | U.S.S.R. . |

Primary Examiner—Morton Foelak
Attorney, Agent, or Firm—Price, Heneveld, Cooper, DeWitt & Litton

[57] ABSTRACT

Foamed polymeric materials exhibiting improved heat resistant properties and improved mechanical properties, as compared with known foamed styrene polymer materials, are obtained by expanding a polymer blend including a syndiotactic styrene polymer and an amount of an amorphous polymeric material which will impart enhanced heat resistant properties to the blend.

21 Claims, No Drawings

HIGH TEMPERATURE SYNDIOTACTIC STYRENE POLYMER FOAM

FIELD OF THE INVENTION

This invention relates to crystalline thermoplastic blends exhibiting improved physical properties, and more particularly to low density, syndiotactic styrene polymer foam blends exhibiting excellent mechanical properties and high heat distortion temperatures.

BACKGROUND OF THE INVENTION

Expanded materials or foams containing amorphous or atactic polystyrene have been widely used in a variety of applications because of their low density, low thermal conductivity, low cost and good energy absorption properties. Particular applications include thermal insulators, disposable containers, and protective packaging.

Most of the important properties of polystyrene, including energy absorption, thermal resistivity, strength to weight ratio, and cost per unit volume, are strongly dependent on density and, therefore, can be easily adjusted by controlling the amount of expansion. However, expanded polymeric materials other than polystyrene foam are often selected where certain nonstrength properties are important, particularly high temperature resistance.

It is known that syndiotactic polystyrene exhibits certain improved heat resistant properties as compared with atactic polystyrene. Specifically, syndiotactic polystyrene has a higher melting point than atactic polystyrene. However, the heat distortion temperature, an important thermal property for expanded polymeric materials, is only about 80° C. for compositions comprised of substantially pure syndiotactic polystyrene. The patent literature suggests that various rubber-like polymers and/or thermoplastic resins can be blended with syndiotactic polystyrene to control viscosity and the rate of crystallization. In particular, it has been disclosed that atactic polystyrene, isotactic polystyrene, polyphenylene ethers, or mixtures thereof are compatible with syndiotactic polystyrene, and that by selecting the amount, type and molecular weight of these polymers, the expansion molding methods used for conventional crystalline resins, such as polyethylene and polypropylene, and for conventional non-crystalline resins, such as atactic polystyrene and polyvinyl chloride, can be applied. The patent literature also discloses that syndiotactic polystyrene can be blended with polyphenylene ethers to provide compositions endowed with enhanced mechanical properties as compared to those containing amorphous polystyrene or isotactic polystyrene. However, the literature does not suggest that polyphenylene ethers or any other materials can be added to syndiotactic polystyrene to improve the mechanical properties thereof at higher temperatures.

SUMMARY OF THE INVENTION

This invention provides styrene polymer materials exhibiting improved heat resistant properties and improved mechanical properties as compared with known expanded syndiotactic styrene polymer materials. Specifically, the syndiotactic styrene polymer materials of this invention exhibit improved heat distortion temperature, while simultaneously exhibiting improved compression strength, as compared with known syndiotactic styrene polymer materials.

The polymeric materials of this invention are obtained from a polymer blend including a syndiotactic styrene polymer and an amount of an amorphous polymeric material which will impart a heat distortion temperature which is at least about 130° C.

In accordance with one aspect of the invention, a polymer blend includes maleic anhydride modified polyphenylene oxide in amount which is sufficient to impart enhanced heat resistant properties.

In accordance with another aspect of the invention, a polymer blend includes from about 60% to about 80% syndiotactic styrene polymer by weight, and from about 40% to about 20% of an amorphous polymeric material by weight, wherein the amorphous polymeric material includes at least one of maleic anhydride modified polyphenylene oxide and a silicone elastomer.

In accordance with a further aspect of the invention, a polymer blend includes syndiotactic polystyrene, polyphenylene oxide, and at least about 10% polycarbonate by weight.

DESCRIPTION OF THE PREFERRED EMBODIMENTS

As used herein, the word "syndiotactic" refers to polymers having a stereo regular structure of greater than 50% syndiotactic of a racemic triad as determined by $C^{13}$ nuclear magnetic resonance spectroscopy.

As used herein, the expression "styrene polymers" refers to polystyrene, poly(alkyl styrene), poly(halogenated styrene), poly(alkoxy styrene), polyvinyl benzylate or mixtures thereof, and copolymers containing syndiotactic styrene polymer blocks as main components. Preferred styrene polymers include polystyrene, poly(p-methyl styrene), poly (m-methyl styrene), poly(p-tert-butyl styrene), poly(p-chlorostyrene), poly(m-chlorostyrene), poly(p-fluorostyrene), and a copolymer of styrene and p-methylstyrene.

The molecular weight of the styrene polymer used in this invention is not critical and can range from about 10,000 to about 10,000,000 or more. Styrene polymers having lower or higher molecular weights can however be used, although those having weight average molecular weights of at least 25,000 are preferred. The molecular weight distribution of the styrene polymers is not critical and may be narrow or wide.

Methods of producing syndiotactic styrene polymers are well known and need not be discussed herein. See for example U.S. Pat. No. 5,066,741 which mentions several well known techniques.

The syndiotactic polystyrene polymeric blends have been found particularly useful in the preparation of expanded or foamed plastics. The amorphous polymeric materials which can be blended with syndiotactic styrene polymers in accordance with the principles of this invention include those amorphous polymers which when blended with a syndiotactic styrene polymer and expanded, form a foamed material having a heat distortion temperature which is substantially higher than the heat distortion temperature of foamed materials formed from an essentially pure syndiotactic styrene polymer. More specifically, the amorphous polymeric material should be capable of imparting a heat distortion temperature which is at least about 130° C., and more preferably at least about 200° C. Examples of amorphous polymeric materials which have been successfully blended with syndiotactic styrene polymers and expanded to produce foamed materials exhibiting improved heat distortion temperatures include maleic anhydride modified polyphenylene oxide, polycarbonate, silicone elastomers, and/or combinations thereof. Maleic anhydride modified polyphenylene oxide may be prepared by reactive extrusion of polyphenylene oxide with maleic anhydride and a suitable free radical initiator. As a specific example, maleic anhydride is grafted to poly(2,6-dimethyl phenylene oxide in a twin screw extruder at 320° C. Three parts of maleic anhydride and two parts of a free radical initiator, such as 2,3-diphenyl-2,3-dimethyl butane, are fed into the extruder per 100 parts by weight of polyphenylene oxide. The resulting maleic anhydride modified polyphenylene oxide is represented by the following general formula:

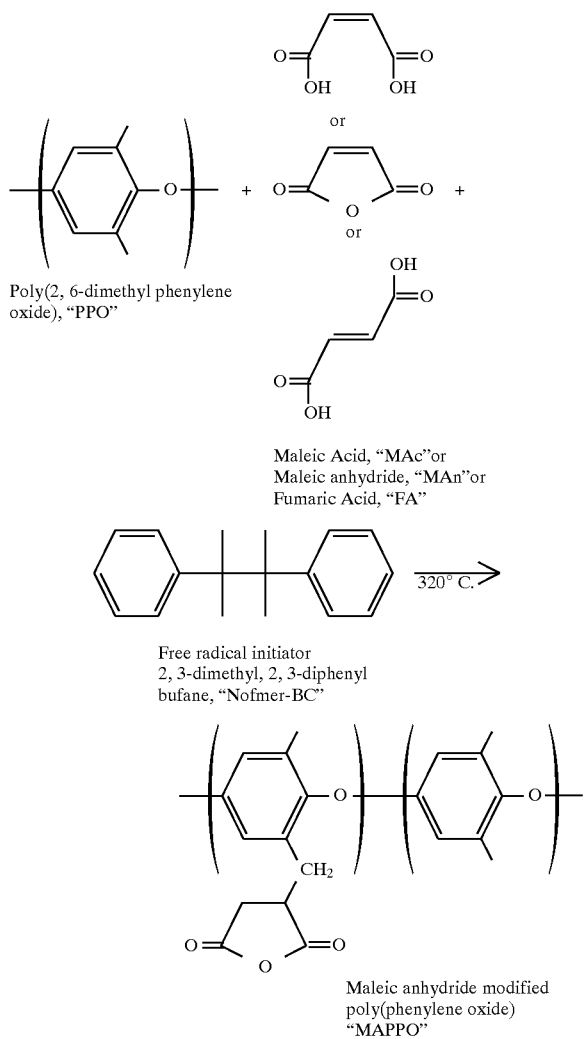

The term "polyphenylene oxide" as used herein refers to any of various homopolymers or heteropolymers having phenylene oxide repeat units and/or substituted phenylene oxide repeat units. The ratio of maleic anhydride to polyphenylene oxide polymer can be higher or lower, and is not limited to three parts per 100 parts of polyphenylene oxide. Maleic anhydride modified polyphenylene oxide can also be prepared by substituting either maleic acid or fumaric acid in place of maleic anhydride. Fumaric acid is presently preferred because it is non-toxic and easy to handle. The process results in about a 2% anhydride grafted to the polyphenylene oxide when three parts of maleic anhydride are used per 100 parts by weight of polyphenylene oxide. Examples of silicone elastomers which have been advantageously employed in the polymer blends of this invention include TREFIL® E501 or E601 which are commercially available from Toray Co. More specifically, it has been found that binary blends of a syndiotactic styrene polymer and maleic anhydride modified polyphenylene oxide can be used to obtain expanded polymeric materials having a heat distortion temperature of at least 130° C., with heat distortion temperatures in excess of 200° C. being obtainable. The binary blends of syndiotactic styrene polymer and maleic anhydride modified polyphenylene oxide also exhibit improved compressive strength and reduced intrinsic brittleness as compared to expanded polymeric materials consisting essentially of pure syndiotactic polystyrene.

Ternary blends consisting of syndiotactic styrene polymer, polycarbonate and maleic anhydride modified polyphenylene oxide, and ternary blends of syndiotactic styrene polymer, polycarbonate and silicone elastomer (TREFIL® E601) have been used to obtain foamed materials exhibiting exceptionally high heat distortion temperatures, while also exhibiting reduced intrinsic brittleness as compare with expanded materials obtained from polymeric compositions consisting essentially of pure syndiotactic polystyrene. Although less preferred because of lower compressive strength, the combination of 75% SPS and 25% polycarbonate also exhibits a heat distortion temperature greater than 200° C.

Another ternary blend exhibiting improved heat distortion temperature properties consists of syndiotactic polystyrene, at least 10% polycarbonate by weight, and at least 10% polyphenylene oxide by weight.

Improved properties can be achieved using various proportions of syndiotactic styrene polymer and the amorphous polymeric materials. However, the expanded polymeric materials of this invention are preferably obtained from a polymer blend comprising at least 50% syndiotactic styrene polymer by weight. More preferably, the polymer blend includes from about 50% to about 80%, and most preferably from about 60% to about 80% syndiotactic styrene polymer by weight. Compositions containing maleic anhydride modified polyphenylene oxide preferably contain at least about 10% maleic anhydride modified polyphenylene oxide by weight.

The styrene polymer-containing crystalline thermoplastic blends of this invention can be expanded to form foamed materials and articles using known molding and extrusion techniques including standard molding techniques and extrusion techniques. For example, the styrene polymer-containing polymer blends of this invention can be combined with a foaming agent to produce expandable polymeric beads containing an integral blowing agent. The expandable beads can be subsequently heated in a mold to form a desired article. As another example, the syndiotactic styrene polymer containing polymeric blends of this invention can be extruded to form sheets, films, slabs, tubes or other extruded shapes.

The foaming agent can generally be mixed with the syndiotactic styrene polymer containing polymeric blend either before molding or extruding, or at the time of molding or extruding. There are no special limitations on the foaming agent which is to be used in practicing the present invention.

The present syndiotactic polystyrene-containing polymer foam blends are generally prepared by heating a syndiotactic polystyrene-containing polymer blend to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such a with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

Because it is generally difficult to provide a non-freezing plug flow through static cooling devices with crystalline engineering thermoplastic resins, the use of a dynamic cooling device which allows the gel to be continuously homogenized while being cooled down to the foaming temperature is preferred to avoid initiation of crystallization and freezing at the metal interfaces of the extrusion apparatus. Accordingly, the crystalline engineering thermoplastic resins of this invention are preferably extruded with blowing agent injected into the molten polymer, with the mixture cooled to the foaming temperature using dynamic cooling devices and expanded through an extrusion dye in the lower pressure region. For example, syndiotactic polystyrene was dry blended with a nucleator and amorphous polymeric additives as described above. The blend was introduced into a Werner Pfleiderer 30 millimeter non-intermeshing, co-rotating twin screw extruder with extruder zone 1 at 245° C., zone 2 at 260° C., zone 3 at 246° C., zone 4 at 243° C., and zone 5 at 260° C., and the dye gel temperature at 233° C. The dye was attached to the end of a dynamic cooling device to cool the gel to the foaming temperature to facilitate high production rates.

Blowing agents useful in making the present foam structure include inorganic agents, organic blowing agents and chemical blowing agents. Suitable inorganic blowing agents include carbon dioxide, nitrogen, argon, water, air nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HFC-141b), 1-chloro-1,1-difluoroethane (HCFC-142), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorflurorcarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonaminde, azodiisobutyronitrile, benzenesulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, and trihydrazino triazine. The amount of blowing agent incorporated into the polymer melt material to make a foam-forming polymer gel is from about 0.2 to about 5.0 gram-moles per kilogram of polymer, preferably from about 0.5 to about 3.0 gram-moles per kilogram of polymer, and most preferably from about 1.0 to 2.50 gram-moles per kilogram of polymer.

The syndiotactic styrene polymer containing blends of this invention may contain, in addition to the amorphous polymeric material which is used to impart improved heat distortion temperatures and improved mechanical properties, various additives such as lubricants, antioxidants, inorganic fillers, ultraviolet ray absorbers, heat stabilizers, flame retardants, anti-static agents, nucleating agents and colorants.

EXAMPLES

Syndiotactic polystyrene (SPS) was dry blended with a nucleator and introduced into a 30 millimeter non-intermeshing, co-rotating twin screw extruder (Werner Pfleiderer) with an extruder zone 1 temperature of 245° C., a zone 2 temperature of 260° C., a zone 3 temperature of 246° C., a zone 4 temperature of 243° C., a zone 5 temperature of 260° C., and a die gel temperature of 233° C. The die was attached to the end of the twin screw extruder discharge. The blowing agent (HCFC-123) was introduced into zone 2 of the extruder. The nucleator (talc) was added at about 0.5 to about 1.0 pph levels to control cell size.

Various samples were prepared in a similar manner by dry blending syndiotactic polystyrene with one or more additives including various combinations of polyphenylene oxide (PPO), maleic anhydride modified polyphenylene oxide (MAPPO), polycarbonate (PC), and a silicone elastomer (E601).

The various samples were analyzed and subjecting to testing to determine density, cell size, heat distortion temperature (HDT), comparative flex product per square inch, compressive strength in the vertical direction and in the extruded direction. Heat distortion temperatures was determined in accordance with ASTM D2126-76, Part 36, density in accordance with ASTM D3575-91, compressive strength in accordance with ASTM D1621 and comparative flex in accordance with ASTM D790-81, with area normalization to account for differences in sample sizes. The results of these tests are summarized in Tables 1A and 1B. The percentages set forth in the tables represent weight percents.

TABLE 1A

| SAMPLE NO | COMPOSITION | DENSITY[1] (pcf) | CELL SIZE (mm) | HDT[2] (C) | COMPARATIVE FLEX PRODUCT PER SQR. IN[3] |
|---|---|---|---|---|---|
| 1 | 100% SPS[5] | 4.25 | 1.62 | 80 | 0.403 |
| 2 | 80% SPS/20% MAPPO | 3.55 | 0.67 | 130~140 | 0.516 |
| 3 | 60% SPS/40% MAPPO | 3.60 | 0.75 | >200 | 0.617 |
| 4 | 75% SPS/15% PC/10% MAPPO | 4.34 | 0.62 | >200 | 0.627 |
| 5 | 80% SPS/15% PC/5% E601 | 5.15 | 0.18 | >200 | 0.434 |
| 6 | 94% SPS/6% PPO | 3.41 | 0.86 | >110 | 0.261 |
| 7 | 85% SPS/15% PPO[5] | 3.89 | — | >120 | 0.54 |
| 8 | 74% SPS/26% PPO[5] | 4.34 | 1.01 | 100~120 | 2.473 |
| 9 | 95% SPS/5% PC[5] | 3.5 | 1.01 | — | 0.199 |
| 10 | 94% SPS/6% PC[5] | 5.04 | 1.50 | >110 | 0.181 |
| 11 | 85% SPS/15% PC[5] | 3.62 | 1.08 | — | 0.170 |
| 12 | 75% SPS/25% PC | 3.66 | 1.20 | >200 | 0.254 |

TABLE 1B

| SAMPLE NO | COMPOSITION | DENSITY[1] (pcf) | CELL SIZE (mm) | HDT[2] (C) | COMPRESSIVE STRENGTH[4] VERTICAL | EXTRUDED |
|---|---|---|---|---|---|---|
| 1 | 100% SPS[5] | 4.25 | 1.62 | 80 | 20.4 | 28.2 |
| 2 | 80% SPS/20% MAPPO | 3.55 | 0.67 | 130~140 | 29.9 | 43.8 |
| 3 | 60% SPS/40% MAPPO | 3.60 | 0.75 | >200 | 35.2 | 55.4 |
| 4 | 75% SPS/15% PC/10% MAPPO | 4.34 | 0.62 | >200 | — | — |
| 5 | 80% SPS/15% PC/5% E601 | 5.15 | 0.18 | >200 | — | — |
| 7 | 85% SPS/15% PPO[5] | 3.89 | — | >120 | 18.4 | 53.9 |
| 12 | 75% SPS/25% PC | 3.66 | 1.20 | >200 | 17.0 | 21.4 |
| 13 | 75% SPS/20% PPO/5% PC[5] | 3.41 | 0.86 | <110 | 23.6 | 51.1 |

[1]ASTM D3575-91
[2]ASTM D2126-76, Part 36
[3]Modified ASTM D790-81 test, with area normalization to account for differences in sample sizes.
[4]ASTM D1621
[5]Comparative Examples In Table 2, various operating parameters for the extrusion process are set forth, including resin rate, blowing agent rate, torque, and die pressure. The melting points (Tf) of various samples are also summarized in Table 2, as are the density, cell size and percent crystallinity. Sample numbers 2, 3, 4, 5 and 12 are in accordance with this invention. The remaining samples were provided for purposes of comparison.

As can be seen by reference to Tables 1A and 1B, the foamed materials in accordance with the invention generally exhibited higher heat deflection temperatures than foamed materials obtained from substantially pure syndiotactic polystyrene, and various binary blends of syndiotactic polystyrene and either polyphenylene oxide or polycarbonate. Additionally, by reference to the values of the comparative flex product per square inch test, it is seen that the more preferred foamed materials of this invention exhibit reduced intrinsic brittleness as compared with foamed materials obtained from substantially pure syndiotactic polystyrene, and various binary blends of syndiotactic polystyrene with

TABLE 2

| SAMPLE NO. | COMPOSITION | RESIN RATE (lb/hr) | BA RATE (pph) | TORQUE (in lb) | DIE PRESS. (psi) | Tf (deg C) | DENSITY (pcf) | CELL SIZE (mm) | % CRYSTALLINITY |
|---|---|---|---|---|---|---|---|---|---|
| 1 | 100% SPS | 4.55 | 8.8 | 733.6 | 250 | 257 | 4.31 | 1.62 | 46.98 |
| 2 | 80% SPS/20% MAPPO | 4.55 | 8.8 | 1244.9 | 1050 | 246 | 3.77 | 0.67 | — |
| 3 | 60% SPS/40% MAPPO | 4.55 | 8.8 | 1333.8 | 900 | 253 | 3.69 | 0.75 | — |
| 4 | 75% SPS/15% PC/10% MAPPO | 4.55 | 8.8 | 1200.4 | 950 | 245 | 4.34 | 0.62 | — |
| 5 | 80% SPS/15% PC/5% E601 | 4.45 | 8.8 | 1778.4 | 850 | 250 | 5.99 | 0.18 | — |
| 6 | 94% SPS/6% PPO (.5 pph Talc) | 5.3 | 8.3 | 1378.3 | — | 228 | 3.41 | 0.86 | 49.63 |
| 7 | 85% SPS/15% PPO (.5 pph Talc) | 4.6 | 6.5 | 1511.6 | — | 215 | 3.89 | 0.54 | 56.89 |
| 8 | 74% SPS/26% PPO (.5 pph Talc) | 4.6 | 6.5 | 1667.3 | — | 216 | 4.34 | 1.01 | 59.77 |
| 9 | 95% SPS/5% PC | 4.55 | 8.8 | 1067.0 | 1000 | — | 3.5 | 1.01 | — |
| 10 | 94% SPS/6% PC (.5 pph Talc) | 5.2 | 6.0 | 1333.8 | — | — | 5.04 | 1.50 | — |
| 11 | 85% SPS/15% PC | 4.55 | 8.8 | 1289.3 | 750 | — | 3.62 | 1.08 | — |
| 12 | 75% SPS/25% PC | 4.55 | 8.8 | 1022.3 | 700 | 255 | 4.10 | 1.20 | 43.72 |

WP; TALC = 1.0 pph; BA = HCFC-123; ⅛" ROD DIE SETUP either polyphenylene oxide or polycarbonate. 75% SPS and 25% PC is less preferred, since while it exhibits higher HDT, its compressive strength is less than that of 100% SPS.

By reference to Table 1B, it can be seen that the foamed materials of this invention generally exhibit improved compressive strength relative to foamed materials obtained from substantially pure syndiotactic polystyrene, and foamed materials obtained from binary blends of syndiotactic polystyrene and either polyphenylene oxide or polycarbonate.

Table 2 illustrates that foamed materials in accordance with this invention can be successfully prepared using techniques which are generally successfully employed in preparing foamed materials from substantially pure syndiotactic polystyrene or binary blends of syndiotactic polystyrene and either polyphenylene oxide or polycarbonate.

It will be apparent to those skilled in the art that various modifications to the preferred embodiment of the invention as described herein can be made without departing from the spirit or scope of the invention as defined by the appended claims.

We claim:

1. A foamed polymeric material obtained from a polymer blend comprising syndiotactic styrene polymer and an amount of an anhydride modified polyphenylene oxide which will impart a heat distortion temperature which is aleast about 130° C.

2. The polymeric material of claim 1, wherein the syndiotactic styrene polymer comprises at least 50% of the polymer blend by weight.

3. The polymeric material of claim 1, wherein the syndiotactic styrene polymer comprises from about 50% to about 80% of the polymer blend by weight.

4. The polymeric material of claim 1, wherein the polymer blend further comprises a polycarbonate.

5. The polymeric material of claim 4, wherein the polymer blend includes at least about 10% polycarbonate by weight and at least about 10% maleic anhydride modified polyphenylene oxide by weight.

6. A foamed polymeric material obtained from a polymer blend comprising at least about 50% syndiotactic styrene polymer by weight, and at least about 10% maleic anhydride modified polyphenylene oxide by weight.

7. The polymeric material of claim 6, wherein the syndiotactic styrene polymer comprises from about 50% to about 80% of the polymer blend by weight.

8. The polymeric material of claim 7, wherein the polymer blend further comprises an amorphous polymeric material other than maleic anhydride modified polyphenylene oxide.

9. The polymeric material of claim 8, wherein the amorphous polymeric material other than maleic anhydride modified polyphenylene oxide is a polycarbonate or a silicone elastomer.

10. The polymeric material of claim 6, wherein the polymer blend includes a polycarbonate.

11. A foamed polymeric material obtained from a polymer blend comprising from about 60% to about 80% syndiotactic styrene polymer by weight and from about 40% to about 20% by weight of an amorphous polymeric material, the amorphous polymeric material including at least one of maleic anhydride modified polyphenylene oxide and a polycarbonate.

12. The polymeric material of claim 11, wherein the polymer blend includes a polycarbonate.

13. The polymeric material of claim 11, wherein the polymer blend includes at least 10% maleic anhydride modified polyphenylene oxide by weight.

14. The polymeric material of claim 11, wherein the polymer blend includes a polycarbonate and maleic anhydride modified polyphenylene oxide.

15. The polymeric material of claim 11, wherein the polymer blend includes a polycarbonate and a silicone elastomer.

16. The polymeric material of claim 11, wherein the expanded polymeric material has a heat deflection temperature of at least 130° C.

17. The polymeric material of claim 11, wherein the expanded polymeric material has a heat deflection temperature of at least 200° C.

18. A foamed polymeric material obtained from a polymer blend consisting essentially of from about 60% to about 80% syndiotactic styrene polymer by weight, and from about 40% to about 20% by weight of an amorphous polymeric material comprising at least one of maleic anhydride modified polyphenylene oxide and a polycarbonate.

19. The polymeric material of claim 18, wherein the amorphous polymeric material consist essentially of polycarbonate and maleic anhydride modified polyphenylene oxide.

20. The polymeric material of claim 18, wherein the amorphous polymeric material consist essentially of polycarbonate and a silicone elastomer.

21. The polymeric material of claim 18, wherein the amorphous polymeric material consist essentially of maleic anhydride modified polyphenylene oxide.

* * * * *

UNITED STATES PATENT AND TRADEMARK OFFICE
CERTIFICATE OF CORRECTION

PATENT NO.  : 5,889,069
DATED       : March 30, 1999
INVENTOR    : Kyung W. Suh et al.

It is certified that error appears in the above-identified patent and that said Letters Patent is hereby corrected as shown below:

Column 2, line 39;
   "10,000,000" should be --1,000,000--.

*Column 5, line 2;
   "such a" should be --such as--.

Column 6, line 3;
   "(HCFC-142)" should be --(HCFC-142b)--.

Column 9, claim 1, line 20;
   "aleast" should be --at least--.

Column 9, claim 5, line 31;
   Delete "maleic anhydride modified".

Column 9, claim 5, line 29;
   "claim 4" should be --claim 1--.

Signed and Sealed this

Twenty-eighth Day of December, 1999

Q. TODD DICKINSON

Attest:

Attesting Officer     Acting Commissioner of Patents and Trademarks